(12) United States Patent
Bravo

(10) Patent No.: US 6,824,750 B2
(45) Date of Patent: Nov. 30, 2004

(54) VERTICAL EXTENDING LIQUID/LIQUID CONTACTING COLUMN

(75) Inventor: Jose Luis Bravo, Amsterdam (NL)

(73) Assignee: Shell Oil Company, Houston, TX (US)

( * ) Notice: Subject to any disclaimer, the term of this patent is extended or adjusted under 35 U.S.C. 154(b) by 694 days.

(21) Appl. No.: 09/758,899

(22) Filed: Jan. 11, 2001

(65) Prior Publication Data

US 2001/0047921 A1 Dec. 6, 2001

Related U.S. Application Data

(60) Provisional application No. 60/183,001, filed on Feb. 16, 2000.

(51) Int. Cl.[7] .............................................. B01D 11/04
(52) U.S. Cl. ...................................... 422/256; 422/255
(58) Field of Search .................................. 422/256, 255

(56) References Cited

U.S. PATENT DOCUMENTS

| | | |
|---|---|---|
| 2,051,545 A | 8/1936 | Collins |
| 2,721,790 A * | 10/1955 | Olney .......................... 208/317 |
| 2,759,872 A * | 8/1956 | Claridge et al. ............. 208/339 |
| 3,410,540 A * | 11/1968 | Bruckert ...................... 261/113 |
| 4,336,106 A | 6/1982 | Winter, III |
| 4,550,000 A | 10/1985 | Bentham |
| 4,627,941 A | 12/1986 | Bentham |

FOREIGN PATENT DOCUMENTS

| | | |
|---|---|---|
| EP | 495418 | 7/1992 |
| EP | 737498 | 10/1996 |

OTHER PUBLICATIONS

International Search Report dated Jul. 17, 2001.

* cited by examiner

Primary Examiner—M. Alexandra Elve
(74) Attorney, Agent, or Firm—Charles W. Stewart

(57) ABSTRACT

A vertical extending liquid/liquid contacting column is disclosed, which column will, when in use, contain a dispersed and a continuous liquid phase, the column having a first liquid feed inlet in the top, a first liquid outlet in the top, a second liquid feed inlet in the bottom, a second liquid outlet in the bottom and a plurality of internal trays axially spaced from each other in the column, each tray provided with a plurality of perforations for the passage of the dispersed phase and more than one downcomer or upcomer for the transport of the continuous phase, wherein the downcomer or upcomer extends respectively below or above the tray and wherein the walls of the downcomer or upcomer are inclined towards each other in the flow direction of the continuous phase. A method of use within the column is also disclosed.

15 Claims, 1 Drawing Sheet

VERTICAL EXTENDING LIQUID/LIQUID CONTACTING COLUMN

This application claims benefit of Provisional 60/183,001 filed Feb. 16, 2000.

FIELD OF THE INVENTION

The invention relates to a vertical extending liquid/liquid contacting column. Such columns are for example used in the solvent extraction of aromatic hydrocarbons from a mixed hydrocarbon feedstock.

BACKGROUND OF THE INVENTION

U.S. Pat. No. 4,336,106 describes a vertical column for the solvent extraction of aromatic hydrocarbons from a mixed hydrocarbon feedstock. The extractor column described in this publication is a vertical cylindrical column containing axially spaced sieve trays, which trays are provided with upcomers.

A disadvantage of the column of U.S. Pat. No. 433,106 is of a low efficiency and capacity.

SUMMARY OF THE INVENTION

The object of the present invention is to provide a column which, when used in an extraction operation, provides an improved efficiency and capacity.

This object is achieved with the following column.

A vertical extending liquid/liquid contacting column, which column will, when in use, contain a dispersed and a continuous liquid phase, the column having a first liquid feed inlet in the top, a first liquid outlet in the top, a second liquid feed inlet in the bottom, a second liquid outlet in the bottom and a plurality of internal trays axially spaced from each other in the column, each tray provided with a plurality of perforations for the passage of the dispersed phase and more than one downcomer or upcomer for the transport of the continuous phase, wherein the downcomer or upcomer extends respectively below or above the tray and wherein the walls of the downcomer or upcomer are inclined towards each other in the flow direction of the continuous phase.

DETAILED DESCRIPTION OF THE INVENTION

Applicants have observed an improved capacity when the column according to the invention is used. Without wishing to be bound to the following theory, applicants believe that the improvement in capacity when compared to the capacity of a column as described in U.S. Pat. No. 4,336,106 is due to the short flow path length of the continuous phase on a tray in the column according to the invention. This effect will become even greater when columns having a wide diameter are used, such as wider than 2 m. The diameter is suitably smaller than 15 m.

The column may be provided with either upcomers or downcomers. A column will be provided with downcomers when the continuous phase in the column during contacting is the liquid having the higher density. When the continuous phase is the liquid having the lower density and consequently will move upwards in the column the column will be provided with upcomers. An example of a widely used liquid-liquid system which will require the use of upcomers is the sulfolane-hydrocarbon system in a process to remove light aromatics from naphtha streams boiling between 15 and 400° C.

In the following description a tray will be described being provided with downcomers. Because the design of trays having downcomers is the same as for trays having upcomers, except that they will be mirrored in the horizontal plane of the tray, the preferred embodiments described below are also applicable to trays having upcomers.

The downcomer opening at tray level may be any shape, for example square, circular or rectangular. Preferably more than one of such downcomers are present in one tray. Preferably the downcomer opening has a rectangular horizontal cross section having a length greater than its width. A rectangular cross section also means a downcomer opening which smaller end side nearest to the circumferential of the tray runs along this circumferential, resulting that these smaller end sides are not arranged parallel relative to each other. This design of the downcomer opening ensures a maximum opening area on the tray. Preferably a downcomer opening is used having parallel smaller end sides. These downcomers are also referred to as boxed downcomers.

The tray layout may be such that the downcomer openings are evenly spaced in the area provided with the perforations. For example rectangular downcomers can be arranged in a row parallel to each other. At both ends of such a row a segmental downcomer may be present. This segmental downcomer will have a downcomer opening which at one end runs parallel to the rectangular downcomers and at the other end follows the circumferential of the tray.

Preferably rectangular downcomers are arranged on the tray in a so-called staggered arrangement. In this arrangement the tray is divided along a horizontal diametrical line in two tray sections, each tray section provided with more than one parallel arranged downcomer positioned perpendicular to the diametrical line. These downcomers extend from the wall, or near to the wall, to the diametrical line of the tray, such that the ends of the downcomers in one tray section meet the diametrical line alternating with the ends of the downcomers in the opposite tray section. Preferably 2–6 rectangular shaped parallel downcomers are present in one tray section. Additionally one or more segmental downcomers may be present on a tray section where the diametrical line meets the column wall. Such a segmental downcomer will have an opening which runs parallel to the longitudinal side of the rectangular downcomers, along the circumferential of the tray and along part of the diametrical line.

When the staggered trays are placed in a column, two consecutive trays will be mirror images of each other with the diametrical line as mirror. This ensures that that the lower end of the downcomer is positioned above the perforations of the tray below. The staggered tray layout is preferred because it prevents vertical by-passing of the continuous phase or said otherwise, it increases the horizontal mixing of the continuous and dispersed phase. A staggered tray is preferably constructed such that the downcomer is supported at one smaller end by a central supporting beam placed along the diametrical line and at the other end by a circumferential beam running along the inner wall of the column.

Preferably the lower or continuous discharging end of the downcomers of one tray are spaced away from the upper end or continuous phase receiving end of the downcomers of the tray just below said tray. This distance is referred to as flow path length and for this invention is defined by the shortest horizontal distance between the center of the continuous phase discharging downcomer and the center of the continuous phase receiving downcomer. Preferably this flow path length is between 0.05 and 0.5 m. A shorter flow path length would result in a less efficient contacting. A greater length would result in more turbulence of the continuous phase above a tray, which in turn would hinder the transport of the dispersed phase, thereby reducing the capacity.

The liquid discharge end of a downcomer is preferably placed at some distance above the tray just below. Preferably the liquid discharge end extends between 30 and 80% of the tray distance below the tray. Preferably the receiving end of the downcomer extends between 0 and 20% of the tray distance above a tray. The tray distance is the distance between two consecutive trays.

The perforations in the tray are preferably simple openings which easily allow the lighter liquid to pass the tray in an upward direction. Preferred openings are sieve openings having a preferred diameter of between 0.004 and 0.025 m. The total area of the perforations on the tray relative to the cross sectional area of the column will depend on the choice of liquids to be contacted and flow rates in the column. Suitably this area is between 2 and 20% of the cross sectional area of the column.

The downcomer has walls which are inclined towards each other in the downward direction. These walls extend partly below and optionally partly above the tray. For construction reasons it is advantageous that the walls of the downcomer extend somewhat above the tray. The slope of these walls is suitably between 1 and 45 degrees relative to the vertical axis of the column. The lower end is preferably provided with a cover, which cover is provided with, preferably downward directed, openings. The dimensions of these openings are preferably so chosen that the continuous phase exiting the openings is accelerated such that its velocity is more than double the velocity of the rising dispersed phase. The downcomer area as measured on the tray level will depend on the specific liquids to be contacted. Preferably this area is between 2 and 20% of the cross sectional area of the column.

The column is preferably provided with between 2 and 100 trays as described above. The number of trays will depend on the specific liquid liquid system to be contacted and the extraction depth required. The column is furthermore preferably provided with a coalescer at the top of the column positioned between the trays and the top liquid outlet. This coalescer improves the phase separation of the dispersed and continuous phase after contacting. Preferably this coalescer has the form of structured packing and is made of a material which has a higher affinity to the dispersed phase than to the continuous phase.

DETAILED DESCRIPTION OF THE DRAWINGS

Figure 1:
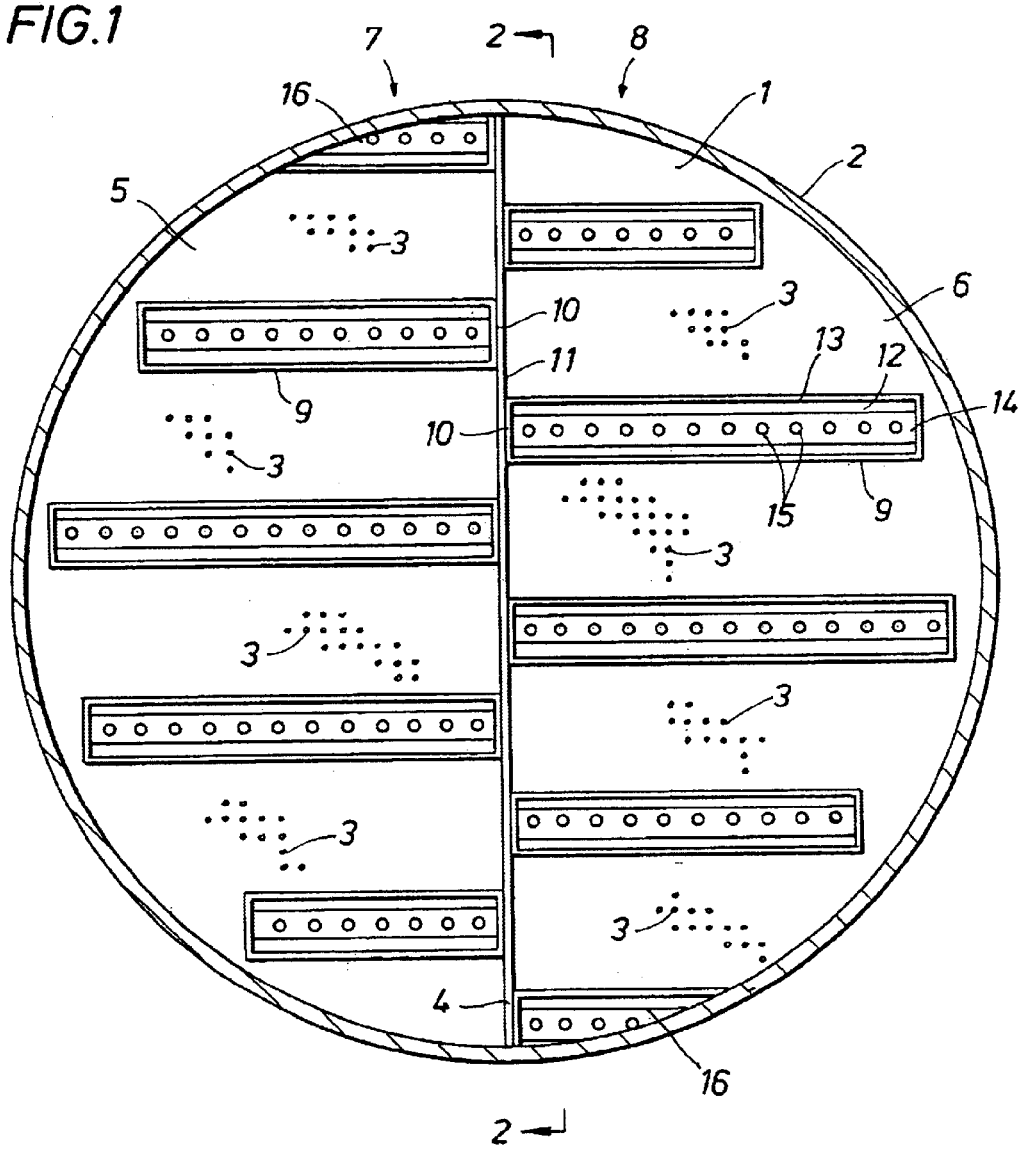
FIG. 1 is a top view of a tray comprising downcomers positioned in a column according to the invention.
Figure 2:
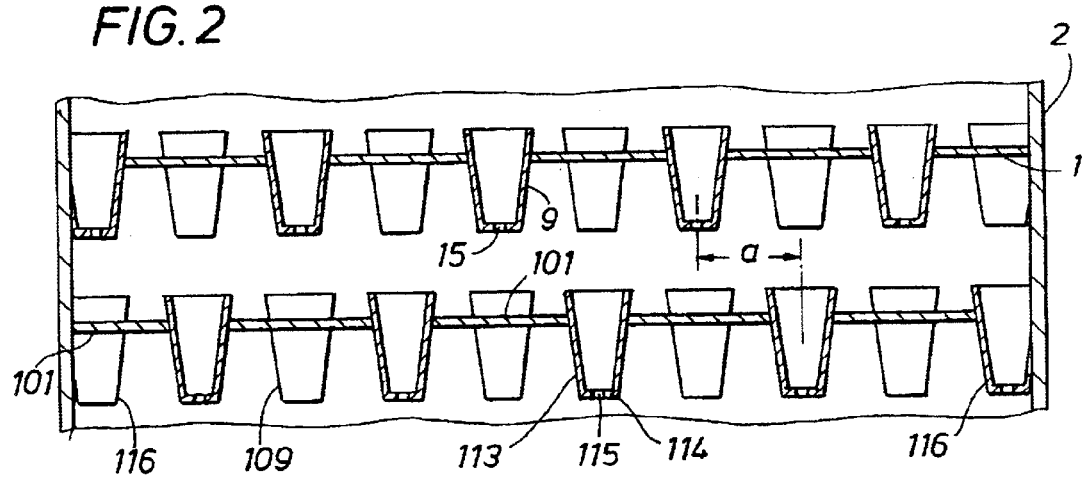
FIG. 2 is a vertical cross-sectional view AA' of FIG. 1.

The invention will be illustrated by making use of FIGS. 1–2.

FIG. 1 is a top view of a tray 1 as part of a column 2. The tray 1 is provided with a plurality of perforations 3 for the passage of the dispersed phase. The tray 1 is divided along a diametrical line 4 in two tray sections 5,6. Each tray section 5,6 is provided with a row 7,8 of parallel rectangular shaped downcomers 9 arranged parallel with respect to each other and perpendicular to the diametrical line 4. The tray layout illustrated in FIG. 1 is a staggered tray layout wherein each downcomer 9 has a smaller end 10 which ends at a supporting beam 11 which beam runs along diametrical line 4. These ends 10 of the downcomers 9 of tray section 5 meet the supporting beam 11 in an alternating fashion with the ends 10 of the downcomers 9 of the other tray section 6.

FIG. 1 also shows the upper opening 12, the sloped downcomer walls 13 and the cover 14 at the lower end of the downcomer 9. Cover 14 is provided with openings 15 for the discharge of the continuous phase flowing downwards. Two segmented downcomers 16 are shown at the position where the diametrical line 4 meets the wall of column 2.

FIG. 2 shows a vertical cross-sectional view AA' of FIG. 1. Two consecutive trays 1,101 are shown as part of column 2. As in tray 1, tray 101 is provided with rectangular downcomers 109 having sloped walls 113, a cover 114 at its lower end, which is provided with liquid discharge openings 115. As shown the liquid discharge openings 15 of the downcomers 9 of row 8 are positioned above part of tray 101 which is provided with perforations 103 (not shown). The resulting flow path length as defined above is shown in this Figure as distance (a). As in tray 1, tray 101 is further provided with segmented downcomers 116. As shown downcomers 9,109 extend somewhat above the tray 1,101.

The column is preferably to be used for liquid liquid contacting. A process in which liquid liquid contacting is commonly used is extraction, wherein one or more components present in a liquid mixture are separated from that mixture by contacting the mixture with a suitable extraction solvent. The column is especially suited for contacting liquid phases which have different densities and an interfacial tension of between 5–55 dyne/cm and preferably below 25 dyne/cm. Examples of possible liquid-liquid systems which can be processed with the column according the invention are DCH (dichlorohydrin)-water, toluene-water, IPE (isopropylether)-water, furfural-lube oil, organic-aqueous acid solution, organic-aqueous caustic solution and organic-water. Examples of extraction processes which can be suitably be performed in a column according to the invention are the extraction of aromatics with furfural in a process to prepare lubricating base oils, extraction of aromatics with sulfolane from hydrocarbon streams boiling between 15 and 400° C., for example naphtha, in a process to recover homogeneous catalyst in a hydroformulation or carbonylation process, in a process to remove phenol from waste water, in a caustic washing process of naphtha and in an acid washing process of the product of an alkylation process.

What is claimed is:

1. A vertical extending liquid/liquid contacting column comprising:
   a top and a bottom, connected by walls;
   a first liquid feed inlet, and a first liquid outlet in the top;
   a second liquid feed inlet, and a second liquid outlet in the bottom;
   a plurality of internal trays axially spaced from each other in the column at a tray distance, each tray comprising:
      a plurality of perforations for the passage of a dispersed phase; and,
      more than one downcomer or upcomer for the transport of a continuous phase, each downcomer or upcomer extending respectively below or above the tray, separated from the downcomer or upcomer of the tray above or below by a flow path length and comprising:
      walls inclined towards each other in the flow direction of the continuous phase; and,
      a liquid discharging end.

2. The column of claim 1, in which the downcomers or upcomers are rectangular.

3. The column of claim 2, in which the rectangular downcomers or upcomers are arranged in a staggered arrangement.

4. The column of claim 1, in which the downcomer or upcomer walls are inclined towards each such that a downcomer or upcomer wall will make a 1 to 45 degrees angle with a vertical axis of the column.

5. The column of claim 1, in which the liquid discharging end of the downcomer or upcomer further comprises a cover with respective downward or upward directed openings, and wherein said liquid discharge end of a downcomer extends between 30 and 80% of the tray distance below the tray and the liquid discharge end of an upcomer extends between 30 and 80% of the tray distance above the tray.

6. The column of claim 1, in which the flow path length is between 0.05 and 0.5 m.

7. The column of claim 1, in which the perforations on the tray are sieve openings having a diameter of between 0.004 and 0.025 m and wherein the total area of said perforations is between 2 and 20% of the cross-sectional area of the column.

8. The column of claim 1, further comprising a coalescer at the top of the column positioned between the trays and the top liquid outlet, wherein said coalescer comprises structured packing having a higher affinity to the dispersed phase than to the continuous phase.

9. The column of claim 1, wherein the column diameter is more than 2 m.

10. A method of contacting two substantially immiscible liquid mixtures having different densities and an interfacial tension of between 5–55 dyne/cm in a column comprising:
   a top and a bottom, connected by walls;
   a liquid feed inlet, and a liquid outlet in the top;
   a liquid feed inlet, and a liquid outlet in the bottom;
   a plurality of internal trays axially spaced from each other in the column at a tray distance, each tray comprising:
      a plurality of perforations for the passage of a dispersed phase; and,
      more than one downcomer or upcomer for the transport of a continuous phase, each downcomer or upcomer extending respectively below or above the tray, separated from the downcomer or upcomer of the tray above or below by a flow path length and comprising:
         walls inclined towards each other in the flow direction of the continuous phase; and,
         a liquid discharging end.

11. The method of claim 10 in which the liquids comprise furfural and a lubricating base oil resulting in the extraction of aromatics.

12. The method of claim 10 in which the liquids comprise sulfolane and a hydrocarbon stream resulting in the extraction of aromatics.

13. The method of claim 10 in which the liquids comprise phenol and water.

14. The method of claim 10 in which the liquids comprise caustic and naphtha.

15. The method of claim 10 in which the liquids comprise an acid and the product of an alkylation process.

* * * * *